Feb. 21, 1933.  O. PROEFKE  1,898,264
COLLET
Filed Dec. 8, 1930
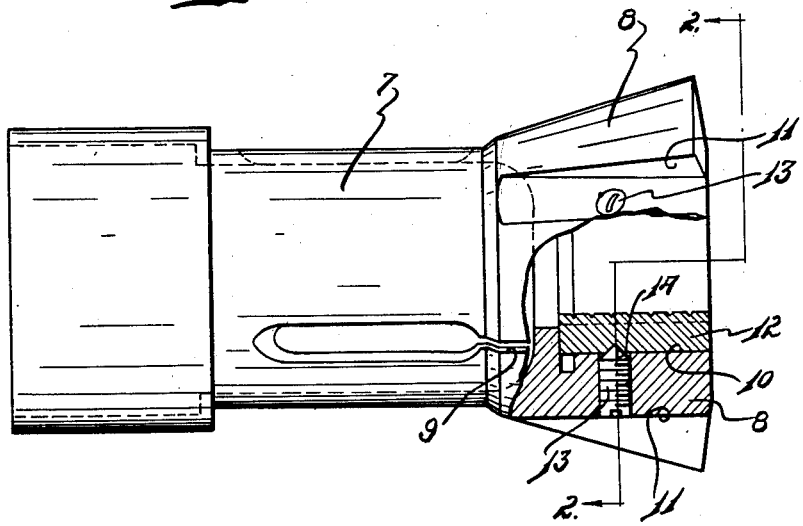
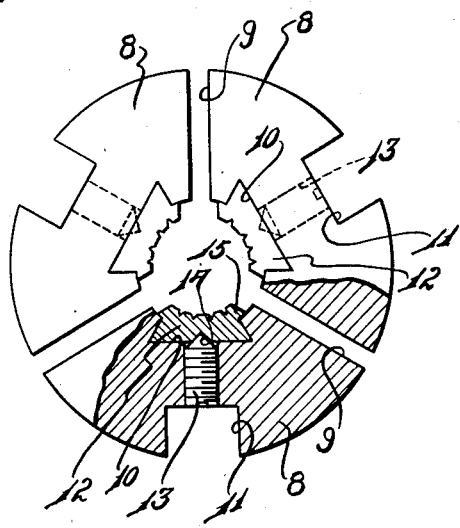
INVENTOR.
OTTO PROEFKE
BY
ATTORNEY Patented Feb. 21, 1933

1,898,264

UNITED STATES PATENT OFFICE

OTTO PROEFKE, OF DETROIT, MICHIGAN, ASSIGNOR TO ENTERPRISE TOOL AND GEAR CORPORATION, OF DETROIT, MICHIGAN, A CORPORATION OF MICHIGAN

COLLET

Application filed December 8, 1930. Serial No. 500,769.

My invention relates to a new and useful improvement in a collet and particularly the structure of the collet which is adapted to grip the work piece. In the manufacture of collets where the gripping surface is a part of the collet head itself and particularly where gripping teeth or serrations are formed on the head, the gripping surface and particularly the teeth become worn in a short time. Particularly is this so when the workpiece is permitted to rotate while clamped closely by the teeth or serrations. The consequence is that the entire collet is discarded and replaced by a new collet, resulting in considerable expense in collet replacements and also in a labor loss. This excessive wear is effected because it is difficult and in many cases impossible to properly harden the gripping teeth or serrations, and it has been found that if the teeth or gripping surfaces are formed from high speed steel, the desired wearability will not be present. The present invention has as its object to overcome these difficulties, and to that end provides detachable gripping members which may be easily and quickly inserted in and removed from the collet head. It has been found that for practical purposes it is necessary that these gripping members be cast, as any other formation will not permit of the proper hardening. It has also been found that it is necessary to use an alloy, and one material which has proven quite satisfactory is the alloy which is known commercially as stellite.

The invention consists in the combination and arrangement of parts hereinafter described and claimed.

The invention will be best understood by a reference to the accompanying drawing which forms a part of this specification, and in which, Fig. 1 is a side elevational view of the invention with a part broken away and a part shown in section.

Fig. 2 is a view taken on line 2—2 of Fig. 1.

As shown in the drawing, the invention is adapted for use with a spring collet having a shank 7 and a split head formed from a plurality of sections 8 separated by the slots 9. A recess 10 is formed in the inner face of each of the sections 8 registering with a peripheral recess 11 formed in each of these sections. A detachable gripping member 12 is inserted in the recess 10 and provided with a flat back face engaging the bottom of the recess 10 and an arcuate serrated or toothed engaging face. A set screw 13 is threaded in each of the sections 8 at the recess 11 to engage in a recess 14 formed in the back face of the gripping member 12. Each of these gripping members 12 is also provided at opposite edges with a shoulder 15 which engages the inner surface of the head section 8 so that the gripping members project inwardly of the inner surface of these sections 8.

By casting these gripping members from an alloy, the desired durability and hardness is obtained and the disadvantages of the usual spring collet are avoided.

While I have illustrated and described the preferred form of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. In a collet of the class described, a spring head having a plurality of separated sections, each of said sections having a recess formed in its inner surface registering with a peripheral recess; a gripping member inserted in the recess in said inner surface and formed of harder material than said head; and a set screw threaded inwardly from said peripheral recess for engaging said gripping member and locking it in position, said set screw being unattached to the gripping member.

2. In a collet of the class described, a spring head having a plurality of separated sections, each of said sections having a recess formed in its inner surface registering with a peripheral recess; a gripping member formed of harder material than said head inserted in the recess in said inner surface; and a set screw threaded inwardly from said peripheral recess for engaging said gripping member and locking it in position, said gripping member having on its back face a recess for reception of the end of said set screw, said set screw being unattached thereto.

In testimony whereof I have signed the foregoing specification.

OTTO PROEFKE.